US005680485A

United States Patent [19]
Loce et al.

[11] Patent Number: 5,680,485
[45] Date of Patent: Oct. 21, 1997

[54] METHOD AND APPARATUS EMPLOYING EROSION-BASED FILTER PAIRS FOR IMAGE MAPPING

[75] Inventors: Robert P. Loce, Webster; Ronald E. Jodoin, Pittsford; Michael S. Cianciosi, Rochester, all of N.Y.

[73] Assignee: Xerox Corporation, Stamford, Conn.

[21] Appl. No.: 359,180

[22] Filed: Dec. 19, 1994

[51] Int. Cl.[6] .................................................. G06T 5/30
[52] U.S. Cl. ........................ 382/257; 382/254; 382/256; 358/443; 358/447; 358/448
[58] Field of Search .............................. 382/257, 258, 382/299, 254, 256; 358/447, 455, 298, 443, 448; 395/128

[56] References Cited

U.S. PATENT DOCUMENTS

| | | | |
|---|---|---|---|
| 4,437,122 | 3/1984 | Walsh et al. | 358/166 |
| 4,544,264 | 10/1985 | Bassetti et al. | 355/14 R |
| 4,625,222 | 11/1986 | Bassetti et al. | 346/160 |
| 4,690,909 | 9/1987 | Bassetti et al. | 346/160 |
| 4,841,375 | 6/1989 | Makajima et al. | 353/280 |
| 4,847,641 | 7/1989 | Tung | 346/154 |
| 5,005,139 | 4/1991 | Tung | 364/519 |
| 5,029,108 | 7/1991 | Lung | 364/519 |
| 5,134,495 | 7/1992 | Frazier et al. | 358/298 |
| 5,150,311 | 9/1992 | Long et al. | 395/108 |
| 5,193,008 | 3/1993 | Frazier et al. | 358/298 |
| 5,206,741 | 4/1993 | Shimura et al. | 358/404 |
| 5,282,057 | 1/1994 | Mailloux et al. | 358/445 |
| 5,387,985 | 2/1995 | Loce et al. | 358/447 |
| 5,471,320 | 11/1995 | Jodoin et al. | 358/455 |
| 5,485,532 | 1/1996 | Ishihara | 382/205 |
| 5,579,445 | 11/1996 | Loce et al. | 395/102 |

OTHER PUBLICATIONS

E. R. Dougherty, *An Introduction to Morphological Image Processing*, SPIE Optical Engineering Press, Bellingham, WA (1992), pp. 3–6, 57–62, 63–66, and 91–118.

Robert P. Loce et al., *Facilitation of Optimal Binary Morphological Filter Design via Structuring Element Libraries and Design Constraints*, Optical Engineering, vol. 31, No. 5, May 1992, pp. 1008–1025.

*Mathematical Morphology in Image Processing*, pp. 43–90 (Edward R. Dougherty ed., Marcel Dekker 1992).

Robert P. Loce et al., *Optimal Morphological Restoration: The Morphological Filter Mean–Absolute–Error Theorem*.

Edward R. Dougherty et al., *Optimal mean–absolute–error hit–or–miss filters: morphological representation and estimation of the binary conditional expectation*, Optical Engineering, vol. 32, No. 4, Apr. 1993, pp. 815–827.

Robert P. Loce, *Morphological Filter Mean–Absolute–Error Representation Theorems and Their Application to Optimal Morphological Filter Design*, Center for Imaging Science, Rochester Institute of Technology, (Ph.D. Thesis), May 1993.

J. Handley and E. Dougherty, "Model–based Optimal Restoration of Fax Images in the Context of Mathematical Morphology," *Journal of Electronic Imaging*, vol. 3, No. 2, (Apr. 1994), pp. 182–189.

Torrey Pines Research, *Behind Hewlett–Packard's Patent on Resolution Enhancement™ Technology*, (Becky Colgan ed., BIS CAP International, 1990) pp. 1–60.

James C. Stoffel et al., *A Survey of Electronic Techniques for Pictorial Image Reproduction*, IEEE Transactions on Communications, vol. COM–29, No. 12, Dec. 1981.

*Primary Examiner*—Peter S. Wong
*Assistant Examiner*—Derek J. Jardieu
*Attorney, Agent, or Firm*—Duane C. Basch

[57] ABSTRACT

The present invention is a method and apparatus for mapping digital image data using paired erosion-based filters. One filter of the pair creates a superset of the output image data and the other a subset of the output image data, and combinatorial logic is then applied to the superset and subset data to obtain the mapped image data. In one embodiment a plurality of erosion-based filters are used where one filter of the pair is extensive and the other filter is antiextensive, each pair generating a sample phase of a high resolution output image.

20 Claims, 6 Drawing Sheets

METHOD AND APPARATUS EMPLOYING EROSION-BASED FILTER PAIRS FOR IMAGE MAPPING

This invention relates generally to a method and apparatus for mapping image data, and more particularly to the use of multiple erosion-based filters, where an extensive filter creates a superset of the output image data and an antiextensive filter a subset of the output image data, and where combinatorial logic is then applied to the superset and subset data to obtain the mapped image data.

CROSS REFERENCE

The following related application is hereby incorporated by reference for its teachings:

"Non-integer Image Resolution Conversion Using Statistically Generated Look-up Tables," Robert P. Loce et al., application Ser. No. 08/170,082, filed Dec. 17, 1993; and "Image Resolution Conversion Method that Employs Statistically Generated Multiple Morphological Filters," Robert P. Loce et al., application Ser. No. 08/169,487, filed Dec. 17, 1993.

BACKGROUND AND SUMMARY OF THE INVENTION

The present invention is a method and apparatus for mapping digital image data. More specifically, one filter of a pair of erosion-based filters creates a superset of the output image data and the other a subset of the output image data, and combinatorial logic is then applied to the superset and subset data to obtain mapped output image data; in particular, multiple pairs generate resolution converted image data. The filters in the present invention are erosion-based filters. Compared to traditional template matching filters, erosion-based filters tend to contain far fewer template patterns (structuring elements), and therefore are much less expensive to implement, although erosion-based filters generally require more effort in design. Moreover, in order to accomplish the various image mapping operations, the erosion-based filters are divided into pairs in the present invention, where one filter of the pair is an extensive filter and the other filter is antiextensive. By employing the filter pairs of erosion-based filters, any shortcomings typically associated with the image quality performance of erosion-based filters may be overcome.

In the present invention, the resulting image signals may be used to drive devices at a required output resolution different from an input resolution without negatively impacting spatially sensitive features within the input image. For example, the method and apparatus of the present invention may be utilized to control a printing device having a scanning beam, where the beam varies in intensity and duration according to the pulses used to control it. As another example, a cathode ray tube uses an electron beam to scan a phosphorous screen. The electron beam may be varied in intensity and duration to accurately display information on the phosphor screen. In both examples, a pulse forming circuit responsive to the output image signal may be used to generate video pulses to control the intensity and operation time of the respective beams.

Heretofore, a number of patents and publications have disclosed various filtering techniques for image mapping operations such as image restoration, the relevant portions of which may be briefly summarized as follows:

E. R. Dougherty, *An Introduction to Morphological Image Processing*, SPIE Optical Engineering Press, Bellingham, Wash. (1992) teaches erosion-based filtering and template matching (referred to as hit-or-miss filtering). The basic operation of erosion is described on pages 3–6, erosion-based filtering is presented on pages 57–62, pages 63–66 describe the hit-or-miss transform, and gray-scale morphology is described on pages 91–118.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter (also known as erosion-based filter or an increasing filter) design. Although the resulting filter is suboptimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter (erosion-based). A suboptimal design methodology is investigated for binary filters in order to facilitate a computationally manageable design process.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teach expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815–827, incorporated herein by reference, disclose the use of a hit-or-miss operator as a building block for optimal binary restoration filters. Filter design methodologies are given for general-, maximum-, and minimum-noise environments and for iterative filters. The hit-or-miss operator is another term used for a template-matching filter.

Robert P. Loce, in *Morphological Filter Mean-Absolute-Error Representation Theorems and Their Application to Optimal Morphological Filter Design*, Center for Imaging Science, Rochester Institute of Technology, (Ph.D. Thesis), May 1993, incorporated herein by reference, discloses design methodologies for optimal mean-absolute-error (MAE) morphological based (erosion-based) filters.

J. Handley and E. Dougherty in "Model-based Optimal Restoration of Fax Images in the Context of Mathematical Morphology," *Journal of Electronic Imaging*, Vol. 3, No. 2, (April 1994), pp. 182–189, teach the use of a hit-or-miss filter, where a bit-double and line-repeat operation is used to achieve a desired sampling resolution and then the filter is employed for enhancement of the resolution converted image. Because the filter is applied to the resampled (higher resolution) space large filtering windows are necessary to achieve acceptable results in a simple conversion. The hit-or-miss filter of Handley and Dougherty is also known as a template-matching filter, or mathematically as a nonincreasing filter. When reference is made to a structuring-element pair, a template where both the 1's and 0's must, respectively, fit within the 1's and 0's of the windowed image data to be considered a fit is intended. This is in contrast to erosion-based filters (also referred to as morphological filters, or increasing filters) where only the 1's of the template must be a subset of the widowed image data to be considered a fit.

In accordance with the present invention, there is provided a method performed in an image processor for mapping data defining an image into data defining a version of the image, comprising the steps of:

applying an erosion-based antiextensive filter to the data defining the image to produce subset image data;

applying an erosion-based extensive filter to the data defining the image to produce superset image data; and logically combining the subset image data and the superset image data to produce the image data of the version.

In accordance with another aspect of the present invention, there is provided an image processing apparatus for mapping data of a first image into data of a second image, comprising:

an erosion-based antiextensive filter for filtering the data of the first image to produce subset data;

an erosion-based extensive filter for filtering the data of the first image data to produce superset data; and logic circuitry for combining the subset data and the superset data to produce the data of the second image.

In accordance with yet another aspect of the present invention, there is provided a method performed in an image processing system for mapping data defining an image at a first resolution into data defining an image of a second resolution, comprising the steps of:

applying a plurality of erosion-based antiextensive filters to the image data of the first resolution to produce subset data for a plurality of image sample phases;

applying a plurality of erosion-based extensive filters to the image data of the first resolution to produce superset data for a plurality of image sample phases; and merging the subset and superset data for the image sample phases to produce the image data of the second resolution.

One aspect of the invention deals with a basic problem in handling numerous document and data formats in open systems, where different devices are electronically linked to one another to provide versatile solutions to a variety of customer needs. A requirement in these open systems is enabling electronic documents to be printed such that the customer does not perceive any difference between versions printed on different output devices. In order to achieve complete device-independence, efficient methods of accurately altering image resolution without modifying image appearance are required. The present invention, being applicable to a variety of image mapping operations, particularly including image resolution conversion, finds advantageous use in mapping an image created on a first device so as to be renderable on a second output device.

This aspect is further based on the discovery of a technique that alleviates the basic data format problem. The technique employs erosion-based filters that, used in pairs, provide the image mapping capability necessary to accomplish image resolution conversion and related image mapping operations. Erosion-based filters have not generally been applied to image mapping situations such as resolution conversion because of their poor performance with respect to bipolar adjustment of a given image region. Bipolar adjustment, as used herein, means that for binary-valued pixels, the state of some pixels must be flipped from 1 to 0 and other pixels from 0 to 1. Current erosion-based filters tend not to perform well (not achieve all of the correct flipping) when both types of flips are required, but do perform well when only one type of flip is required. In other words, erosion-based filters tend to perform well when the desired output image is either a subset or super set of the input, but not a general transformation of the input. For gray-scale filtering, bipolar adjustment refers to lowering some values while raising others within a given image region. The present invention overcomes such problems by employing erosion-based filters in pairs, where the extensive (maps to a superset) and antiextensive (maps to a subset) filters in a pair are each designed to handle the bipolar situation differently, and the output of the filters is then combined logically to produce the filtered output. The technique described above is advantageous because it results in much simplified hardware requirements to implement the erosion-based filter pairs as compared, for example, to template-based (hit-or-miss-based) filters.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information and specifically includes binary image information. When an item of data can indicate one of a number of possible alternatives, the item of data has one of a number of "values."

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor memory (e.g., ROMs and RAMs).

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. An "image processor" or "image processing system" is a data processing system primarily employed to process data representing an image. For example, an image processor may be a general purpose computer workstation or a dedicated data processor embedded within an input or image output device. A "data processor" or "processor" is any component or system that can process data, and may include one or more central processing units or other processing components.

An "array of data," "data array" or "array" is a combination of items of data that can be mapped into an array. A "two-dimensional array" is a data array whose items of data can be mapped into an array having two dimensions.

An "image" is a pattern of physical light. An image may include characters, words, and text as well as other features such as graphics. An image may be divided into "segments," each of which is itself an image. An example of a two-dimensional array is a array of image irradiance data acquired by a linear sensor array (LSA) from the surface of a document when relative motion is imparted between the LSA and the document. An item of data "defines" an image when the item of data includes sufficient information to produce the image. For example, a two-dimensional array can define all or any part of an image, with each item of data in the array providing a value indicating the color, irradiance level, or marking state of a respective area of the image.

A "pixel" is the smallest segment or area into which an image is divided in a given system. In an array defining an image in which each item of data provides a binary value, each value indicating the marking state of an area may be called a "pixel value." Each pixel value is a bit in a "binary form" of a digital image, a gray scale value in a "gray scale form" of a digital image, or a set of color space coordinates in a "color coordinate form" of a digital image, the binary form, gray scale form, and color coordinate form each being a two-dimensional array defining an image. The term image signal, video data, and pixel are used herein to describe discrete digital signals that represent the active (on) or inactive (off) state of a segment within a digital image such as a binary image. In addition, shaded or cross-hatched portions of image bitmaps depicted herein are intended to represent black or active pixels (having a binary value of 1) within the bitmaps. Such a representation is not intended to limit the present invention to binary imagery, but to simplify the description thereof. Accordingly, the present invention may be operated in the same manner by substituting white pixel states wherever black pixels are indicated, and vice versa.

An operation performs "image processing" when it operates on an item of data that relates to all or part of an image. An "image characteristic" or "characteristic" is a measurable attribute of an image. An operation can "measure" a characteristic by producing data indicating the characteristic using data defining an image.

A "version" of a first image is a second image produced using an item of data defining the first image. The second image may be identical to the first image, or it may be modified, such as by resolution mapping, enhancement or other image processing operations.

An "image-to-image mapping" operation may be applied to an image to create or produce a version of the image. Image-to-image mapping operations include operations such as image resolution conversion, image restoration, halftoning, color correction, and tone adjustment. However, the present invention will be described herein with respect to an embodiment directed to mapping a digital image to a version of the digital image, in particular, an enhanced or resolution-converted version of the image.

An "image input device" (IIT) is a device that can receive an image and provide an item of data defining a version of the image. A "scanner" is an image input device that receives an image by a raster scanning operation, such as by scanning or rasterizing a document. Examples of image input devices include, but are not limited to, digital scanners such as the Xerox® 7650 ProImager, digital reprographic devices such as the Xerox® DocuTech Production Publisher, and facsimile machines such as the Xerox® 70XX Telecopier® family.

An "image output device" (IOT) is a device that can receive an item of data defining an image and provide the image as output. A "display" is an image output device that provides the output image in human viewable form. The visible pattern presented by a display is a "displayed image" or simply "image."

An "erosion-based filter" is a set of Boolean logic operations that may be represented as a union (OR or MAX) of morphological erosions, as defined by the field of mathematical morphology. At a given pixel location, the output of each erosion is determined by a subset "fit" criterion for the given structuring element: if the structuring element is a subset of the observed image pattern, the output is a one, otherwise it is zero. The term "subset" means that all pixels with a value of 1 in the structuring element also have a value of 1 in the observed image pattern. Similar definitions are known for the related gray-scale morphological operations and can be found in the publication by E. R. Dougherty, entitled *An Introduction to Morphological Image Processing*, SPIE Optical Engineering Press, Bellingham, Wash. (1992).

A "structuring element" is also known as an element of structure. For binary image morphology, a "structuring element" is a group of pixels that possess a value of one. The term "erosion templates," refers to a group of pixels within a defining template pattern, where only those pixels possessing a value of 1 are relevant to subsequent calculations, and other pixels may be characterized as being in a "don't care" state. Hereagain, similar definitions are applicable to the related gray-scale structuring elements and can be found in the Dougherty book noted above.

A "structuring-element pair" is a template where one member of the pair is used in an erosion operation on the 1's within an image and the other member is used in an erosion operation on the compliment of the 0's within an image. A hit-or-miss transform utilizes structuring-element pairs, and upon both members meeting the fit criterion, the output is a "1," otherwise, the output is a "0". In the field of digital document processing, structuring element pairs are usually loosely referred to as "templates" and template-matching typically refers to the morphological hit-or-miss transform. A template matching filter usually refers to a union (OR or MAX) of hit-or-miss transforms.

Figure 1:
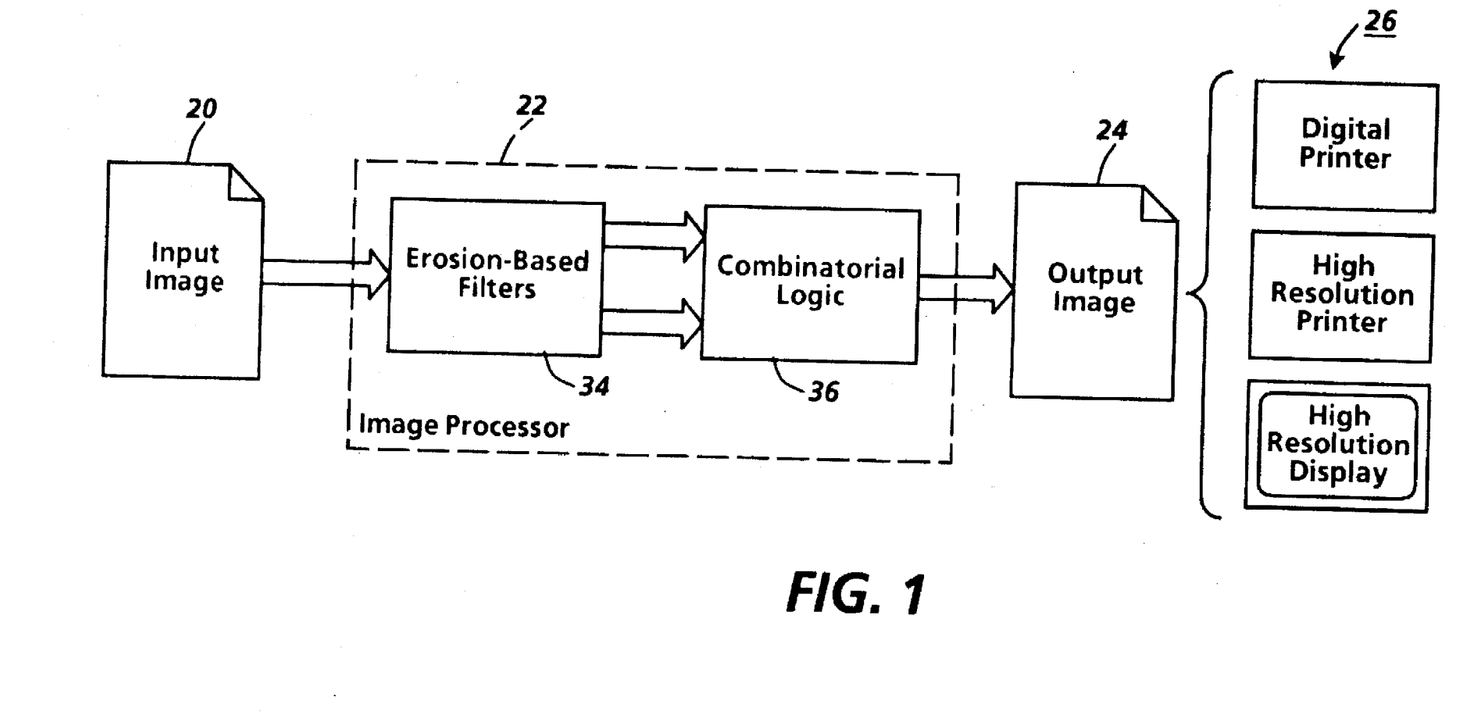
FIG. 1 is a block diagram of an image processing system in which the present invention finds particular use.

FIG. 1 is a block diagram of a digital printer that illustrates an image processing embodiment of the present invention. As shown, a low resolution input image 20 is presented to a digital image processing system 22 to produce an output image 24 that may be printed, displayed, or otherwise rendered in viewable form by one of the output devices 26. The low resolution image may originate from an image input terminal, and may have been temporarily stored on a storage medium. Digital image processor 22 is preferably a data processor including elements of the present invention, particularly an erosion-based filter 34 that transforms the input bitmap into paired output data, and combinatorial logic 36 that operates on the paired output data to produce output image 24. In one embodiment, the input image 20 may be enhanced to produce output image 24 at a resolution different than that of input image 20. Although an embodiment described herein is an image processor associated with a digital printing or display system, the present invention may be applied to other systems where various image mapping operations, including but not limited to image resolution conversion, are required.

Figure 2:
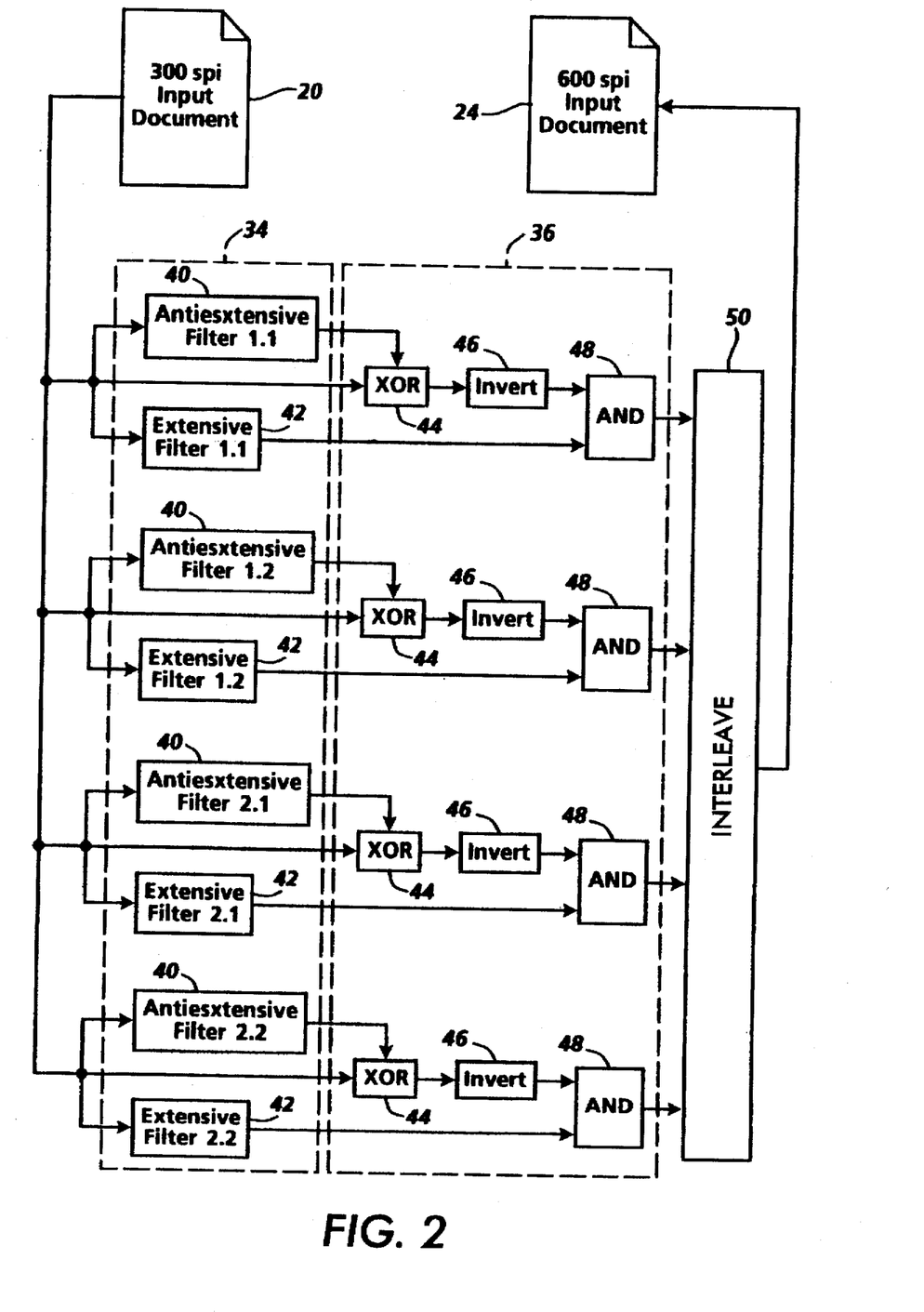
FIG. 2 is a is a simplified block diagram illustrating the primary components of the present invention.

Referring to FIG. 2, there is illustrated a general block diagram of the image processing operations accomplished within image processor 22. Generally, the mapping operations performed on an input image A by the extensive and antiextensive filter pairs, and associated boolean logic, can be characterized as:

$$\psi(A)=[A\Delta\psi_1(A)]^c \cap \psi_2(A), \quad (1)$$

where the overall mapping of image A is denoted by $\psi(A)$ the filter pair $\psi_1$ and $\psi_2$ are antiextensive and extensive mappings, respectively, $\Delta$ is used to represent the symmetric difference (set notation for XOR), c the compliment (INVERT), and $\cap$ the intersection (AND). For resolution conversion operations multiple filter pairs can be used to create multiple samples or phases that may then be interleaved to form higher resolution output image. Note that logically equivalent Boolean operations could also be used to combine the output of the extensive and antiextensive filters, such as $$\psi(A)=[A\Delta\psi_2(A)] \cup \psi_1(A), \quad (2)$$

where $\cup$ is used to represent the union (logical OR) of two sets. Furthermore, while illustrated and described herein in a binary form, it is straightforward to extend these Boolean operations to digital, gray-scale image processing using the morphological umbra as has been described in morphological image processing text books such as the one by E. R. Dougherty.

FIG. 2 depicts a 300 spot per inch (spi) input document 20 being passed in parallel to a plurality of paired filter sections (E-H) within filter block 34. The filter section includes pairs of antiextensive filters 40 and extensive filters 42. As will be discussed in more detail with respect to FIGS. 6A-D and 7A-D, each of the filters in pairs E through H are erosion-based filters comprised of what may be characterized as erosion templates (or structuring elements), as contrasted with commonly employed templates (i.e., structuring element pairs - 1's and 0's must be a subset of the image 1's and 0's, respectively). Considering one pair of filters, the output of antiextensive filter 40, referred to herein as the subset data, is provided as one input to an XOR (exclusive-or) block 44 which XORs the subset data with the associated data of the input image. The output of XOR block 44, is then inverted at INVERT block 46, and passed to AND block 48 where the processed subset data is ANDed with superset data output by extensive filter 42. Subsequently, the logically combined subset and superset data is passed as one sample phase of the output data to interleave block 50.

Figure 3:
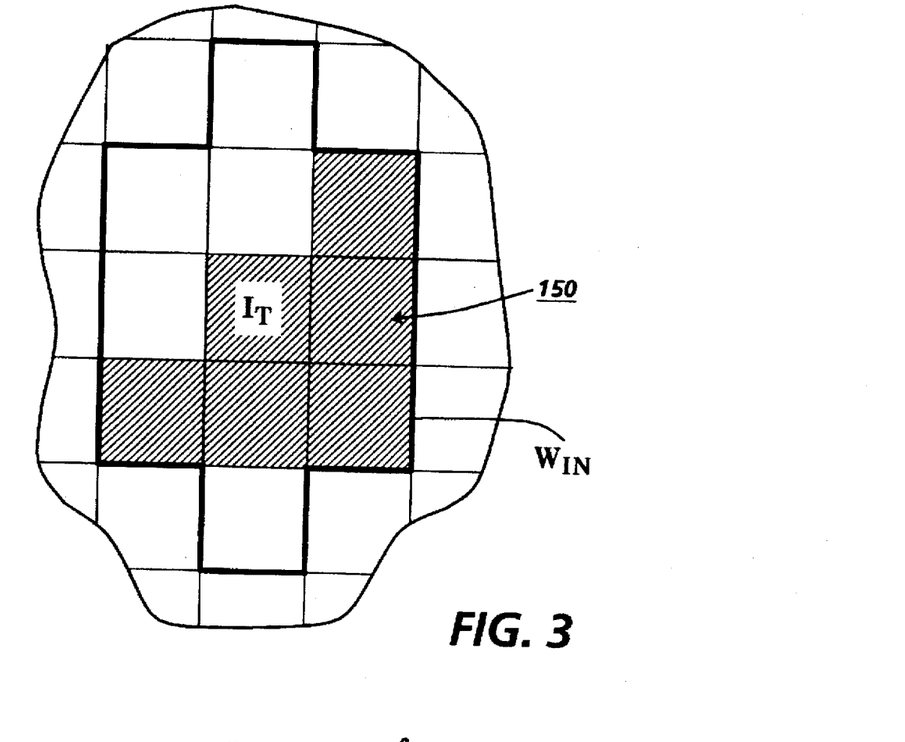
FIG. 3 is an illustration of an exemplary section of an image with an image window defined in accordance with the erosion-based filters of FIG. 2 superimposed thereon.
Figure 4:
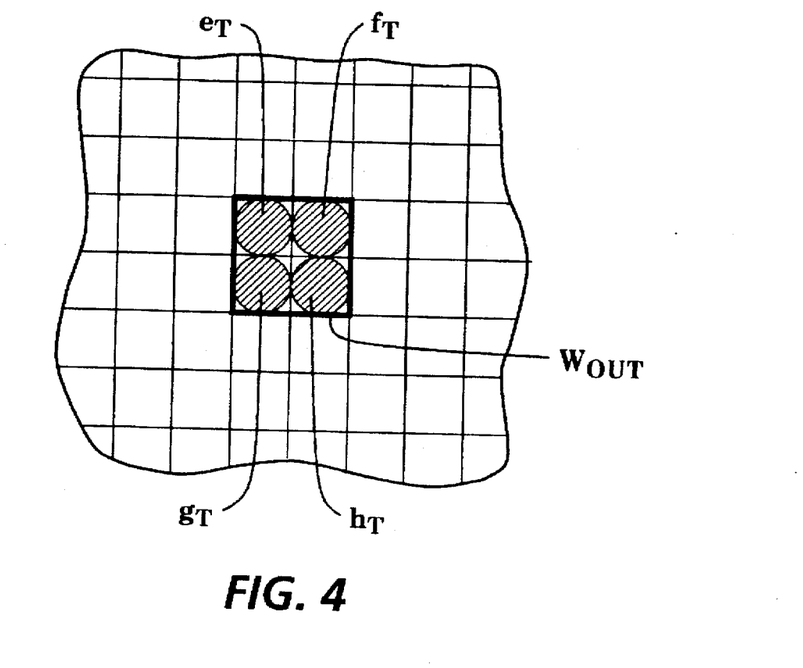
FIG. 4 is an illustration of the various sample phases of output image data that may be derived by the present invention in an exemplary image resolution conversion embodiment.

Interleave block 50 is electronic circuitry generally suited to recombine the sample phased outputs from the plural (four in the present example) filter sections, paired filter and logic sections E through H, in the case of a 2× resolution increase. More specifically, each section, E, F, G and H, is designed to produce output pixels for one of the four phases of the 600 spi output image. As illustrated, for example, by Loce et al. in application Ser. No. 08/169,487 (filed Dec. 17, 1993), hereby incorporated by reference for its teachings, each pixel of the 300 spi input image "produces" four pixels in the 600 spi output image. As illustrated in FIGS. 3 and 4, which depict portions of the input and output images respectively, the input target pixel $I_T$, in the center of the input window $W_{in}$, is used to produce the four output pixels $e_T$, $f_T$, $g_T$ and $h_T$ of the output window $W_{out}$ in FIG. 4. As is apparent from spatial relationship of the output pixels, there are four phases in the 2× output image. Thus, interleave block 50 serves to order the data output by the four phase sections into the appropriate position in the higher resolution output bitmap 24. It will be further appreciated that numerous circuits to accomplish the interleave operation are available, including a multiplexer as will be described with respect to FIGS. 5A–5B.

A key point is that the present invention decomposes the filtering operation for each of the known output phases to consist of antiextensive and extensive mappings that are then combined with Boolean logic operations in the case of binary image filtering, or max/min operations for gray-scale image filtering. Moreover, the mappings are in this form, very compact, typically having at most four or five required logic comparisons so that inexpensive erosion-based filters may be employed to perform the conversion while yielding high quality output. Design of the erosion-based filters may be accomplished in the manner described by Loce et al. in U.S. patent application Ser. No. 08/169,487, previously incorporated by reference, where training sets of images are employed to generate the paired filters. Again, a filter pair is created for each sampling phase required by the output resolution (or more appropriately the conversion ratio) as described above.

As an illustrative example, a set of filters designed to perform a mapping operation such as a 300 spi to 600 spi resolution conversion could consist of four pairs of erosion-based filters that contained a total of 26 erosion templates (structuring-elements) as summarized in Table 1. The entries in the table indicate the number of erosion templates in each filter and the number of active pixels in each template. It is important to note that the commonly employed template-matching processes (hit-or-miss operators) for a similar conversion employ hundreds of hit-or-miss templates (structuring-element pairs) to accomplish a similar filtering operation.

Figure 5A:
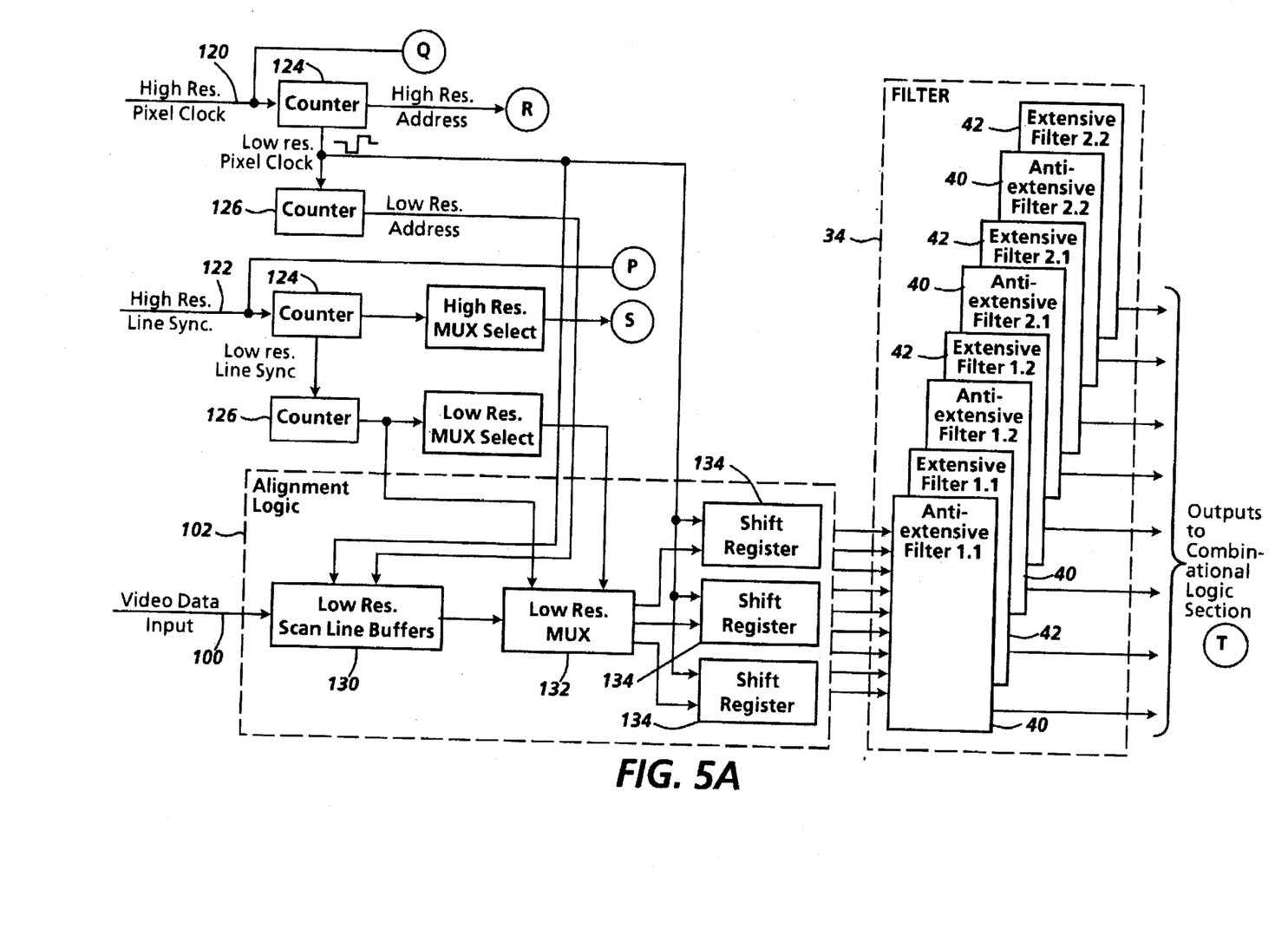
FIGS. 5A and 5B are a detailed block diagram illustrating the various elements of the components of FIG. 2.
Figure 5B:
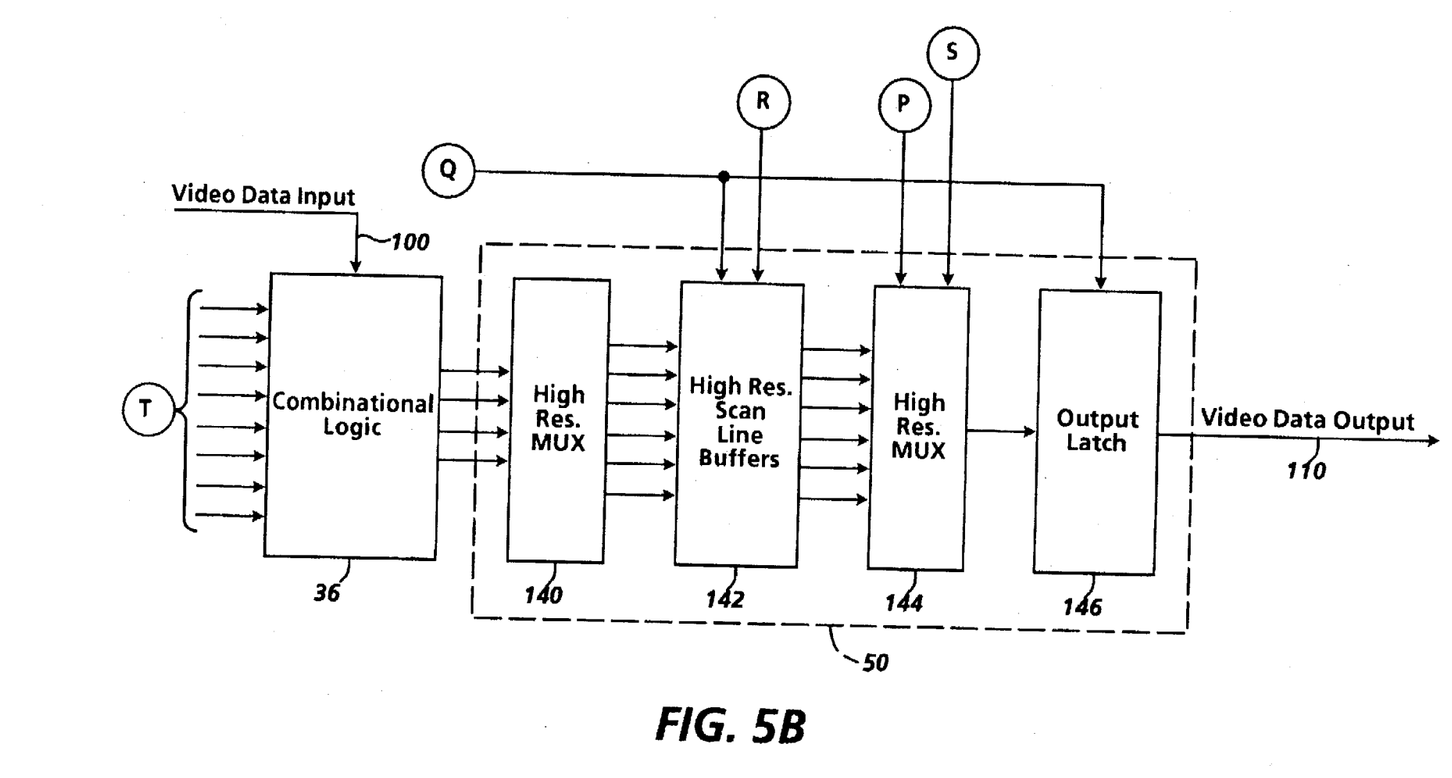
Figure 6A:
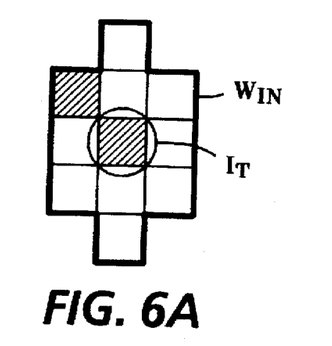
FIGS. 6A–6D are representations of an exemplary antiextensive erosion-based filter in accordance with the present invention.
Figure 6B:
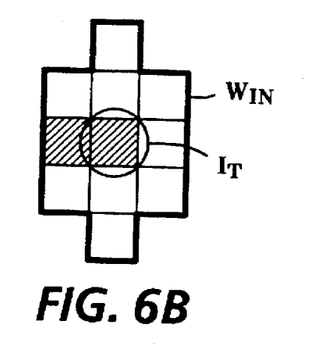
Figure 6C:
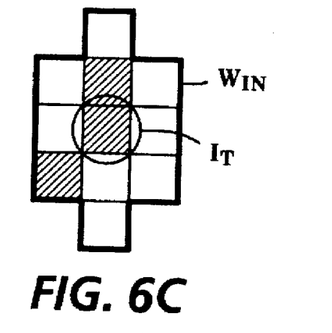
Figure 6D:
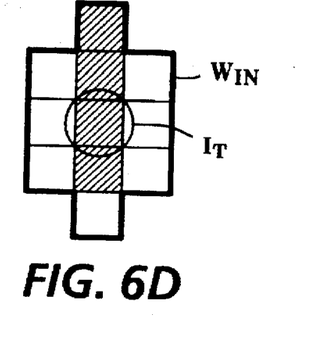
Figure 7A:
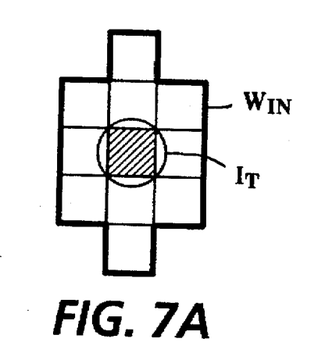
FIGS. 7A–7D are representations of an exemplary extensive erosion-based filter in accordance with the present invention.
Figure 7B:
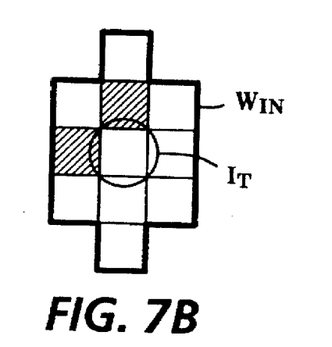
Figure 7C:
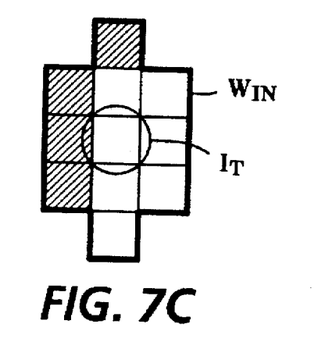
Figure 7D:
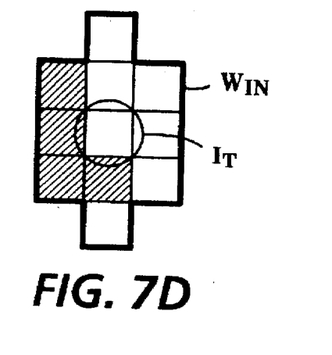

FIGS. 5A and 5B together illustrate a block diagram of a preferred hardware implementation for the present invention. Referring

TABLE 1

| Extensive Filters (10 templates) | # of Elements in each Filter | # of Pixels in Element 1 | # of Pixels in Element 2 | # of Pixels in Element 3 | # of Pixels in Element 4 |
|---|---|---|---|---|---|
| Phase 1.1 | 4 | 1 | 2 | 4 | 4 |
| Phase 1.2 | 2 | 1 | 3 | 2 | 0 |

TABLE 1-continued

| Extensive Filters (10 templates) | # of Elements in each Filter | # of Pixels in Element 1 | # of Pixels in Element 2 | # of Pixels in Element 3 | # of Pixels in Element 4 |
|---|---|---|---|---|---|
| Phase 2.1 | 3 | 1 | 3 | 3 | 0 |
| Phase 2.2 | 0 | 0 | 0 | 0 | 0 |
| Anti-extensive Filters (16 templates) | | | | | |
| Phase 1.1 | 4 | 2 | 2 | 3 | 4 |
| Phase 1.2 | 4 | 2 | 2 | 3 | 4 |
| Phase 2.1 | 4 | 2 | 3 | 3 | 3 |
| Phase 2.2 | 4 | 2 | 2 | 2 | 2 | to FIGS. 5A and 5B, input image data is provided on line 100 and, as a result of processing in the alignment logic block 102, the filter block 34, the combinatorial logic block 36 and the output interleave block 50, higher resolution image data (reference numeral 24 of FIG. 1) is made available on line 110. Also input to the circuitry illustrated in FIGS. 5A and 5B are high resolution pixel and line synchronization signals. From these two signals, the lower resolution timing signals and address data are derived using counters 124 and 126, respectively. For example, to obtain the low resolution pixel clock in the 300 spi to 600 spi mapping operation, the high resolution pixel clock on line 120 would be passed through a divide-by-two counter 124, as would the high resolution line sync signal. Preferably, the counters employed in the hardware circuitry illustrated would be programmable counters so as to enable resolution mapping operations at various conversion ratios.

Under control of the various clock, synchronization and address signals as illustrated, the bitmap input image or video data is stored in a plurality of parallel scan line buffers 130 within alignment logic block 102. Scan line buffers 130 are memory circuits sufficient in number so as to provide context for the input window ($W_I$), the image data within the window being the data upon which the filters will operate. Once stored in the scan line buffers, the image data is selectively advanced, via the low resolution multiplexer 132, to a plurality of parallel shift registers 134. Shift registers 134 essentially store the binary image state (0 or 1) of the target and surrounding pixels as illustrated in FIG. 3. Thus, the output from the alignment logic block is a plurality of parallel input signals, one for each element or pixel location of the input window $W_I$, as illustrated in FIG. 3.

The parallel input signals generated by alignment logic block 102 are then passed to filter block 34 where they are operated on, again in parallel, by the phased, erosion-based filter pairs as previously described with respect to FIG. 2. Preferably, the erosion-based filters of the present invention are logically compact enough to be implemented with combinatorial logic. Thus, the phased filter functions ($\psi_1$ and $\psi_2$) are small enough to be contained in relatively inexpensive programmable logic arrays (PLAs), field programmable gate arrays (FPGAs) or application specific integrated circuits (ASICs).

FIGS. 6A–6D and 7A–7D respectively depict exemplary erosion filter templates (structuring elements) for the anti-extensive and extensive filter pairs. In each figure, the circled image pixel indicates the center of the filter window (e.g., target pixel $I_T$ to be converted), cross-hatched squares indicate pixels possessing a binary value 1, and white or blank squares indicate don't-care pixels. Most importantly, the don't-care pixels do not require logic gates and are only illustrated to present an orderly representation for each window and for relative comparison therebetween. As is apparent from the large number of don't-care pixel locations in each of the filter templates indicated, very few logic gates are required to perform the individualized erosion-based filtering operations.

Referring again to FIGS. 5A and 5B, the binary outputs of the individual erosion-based filters, commonly referenced by the letter T in the figures, are subsequently merged using combinatorial logic and alignment circuitry. The merging of the binary output (T) is accomplished by first routing the output to a combinatorial logic section 36 for logic processing using the previously described XOR, OR, AND and INVERT operations as represented in Equations (1) and (2). Subsequently, the outputs of the combinatorial logic section are combined via high resolution multiplexer 140 so that they may be stored in high resolution scan line buffers 142 which are also comprised of well-known memory circuits. The higher resolution data stored therein may then be routed to output multiplexer 144 and latched for final output by output latch 146. Hence, the resulting image data or resolution converted version of the image is appropriately "clocked out" or "interleaved." Alternatively, the high resolution image data may be routed to additional image processing circuits (not shown). The interleaving block circuitry, as described, would preferably be incorporated into a gate array along with the filter functions.

In recapitulation, the present invention is a method and apparatus to perform digital image-to-image mapping using paired erosion-based filters. One filter of the pair creates a superset of the output image data and the other a subset of the output image data, and combinatorial logic is then applied to the superset and subset data to obtain the mapped image data. In one embodiment a plurality of erosion-based filters are used where one filter of the pair is extensive and the other filter is antiextensive, each pair generating a sample phase of a high resolution output image.

It is, therefore, apparent that there has been provided, in accordance with the present invention, a method and apparatus for mapping digital image data using erosion-based filters, and more particularly to converting the resolution of an input image using paired extensive and antiextensive filters. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method performed in an image processor for mapping data defining an image into data defining a version of the image, comprising the steps of:

applying an erosion-based antiextensive filter to the data defining the image to produce subset image data;

applying an erosion-based extensive filter to the data defining the image to produce superset image data; and logically combining the subset image data, the superset image data, and the data defining the image to produce the image data of the version.

2. The method of claim 1, wherein the antiextensive and extensive filters are paired so as to map data defining the image in a bipolar fashion.

3. The method of claim 2, wherein the step of logically combining the subset image data and the superset image data comprises:

XORing the subset image data with the image data to produce a first interim set of data;

inverting the first interim set of data to produce an inverted set of data; and

ANDing the inverted set of data with the superset image data to produce the image data of the version.

4. The method of claim 2, wherein the step of logically combining the subset image data and the superset image data comprises:

XORing the superset image data with the image data to produce a first interim set of data; and ORing the first interim set of data with the subset image data to produce the image data of the version.

5. An image processing apparatus for mapping data of a first image into data of a second image, comprising:

an erosion-based antiextensive filter for filtering the data of the first image to produce subset data;

an erosion-based extensive filter for filtering the data of the first image to produce superset data; and logic circuitry for combining the subset data, the superset data, and the data of the first image to produce the data of the second image.

6. The apparatus of claim 5, wherein said antiextensive and said extensive filters are paired so as to accurately map data defining the image regions in a bipolar fashion.

7. The apparatus of claim 6, wherein said logic circuitry comprises:

an XOR circuit for XORing the subset image data with the image data to produce a first interim set of data;

an INVERTER circuit for inverting the first interim set of data to produce an inverted set of data; and an AND circuit for ANDing the inverted set of data with the superset image data to produce the image data of the second image.

8. The apparatus of claim 6, wherein said logic circuitry comprises:

an XOR circuit for XORing the superset image data with the image data to produce a first interim set of data; and an OR circuit for ORing the first interim set of data with the subset image data to produce the image data of the second image.

9. A method performed in an image processing system for mapping data defining an image at a first resolution into data defining an image of a second resolution, comprising the steps of:

applying a plurality of erosion-based antiextensive filters to the image data of the first resolution to produce subset data for a plurality of image sample phases;

applying a plurality of erosion-based extensive filters to the image data of the first resolution to produce superset data for a plurality of image sample phases; and combining the subset data and superset data for the image sample phases with the data defining the image at the first resolution to produce the image data of the second resolution.

10. The method of claim 9, wherein the plurality of antiextensive and extensive filters are associated as a plurality of pairs of extensive and antiextensive filters so as to map data defining the image in a bipolar fashion.

11. The method of claim 9, wherein the step of merging the subset image data and the superset image data comprises:

(a) selecting one of the image sample phases;

(b) logically combining subset and superset data for the sample phase selected to produce image data of the version for the sample phase selected, the image data produced for the version for the sample phase selected being of the first resolution; and (c) executing steps (a) and (b) for each of the plurality of image sample phases; and (d) interleaving the image data produced for the versions of the plurality of image sample phases to produce the image data of the second resolution.

12. The method of claim 11, wherein the step of interleaving the image data produced for the versions of the plurality of image sample phases comprises:

storing the image data produced for the versions of the plurality of image sample phases in a plurality of high resolution scan line buffers;

routing the image data stored in the high resolution scan line buffers to an output multiplexer;

selecting, using the output multiplexer, image data in response to a high resolution line sync signal; and latching image data selected by the multiplexer to produce the image data of the second resolution.

13. The method of claim 11, wherein the step of logically combining the subset image data and the superset image data comprises:

XORing the subset image data with the image data to produce a first interim set of data;

inverting the first interim set of data to produce an inverted set of data; and

ANDing the inverted set of data with the superset image data to produce the image data of the version.

14. The method of claim 11, wherein the step of logically combining the subset image data and the superset image data comprises:

XORing the superset image data with the image data to produce a first interim set of data; and ORing the first interim set of data with the subset image data to produce the image data of the version.

15. The method of claim 9, further comprising the step of aligning the data defining the image at a first resolution so that said steps of applying a plurality of erosion-based antiextensive filters and applying a plurality of erosion-based extensive filters operate concurrently on the same image data of the first resolution.

16. The method of claim 15, wherein the step of aligning the data defining the image at a first resolution comprises the steps of:

storing the data defining the image at the first resolution in low resolution scanline buffers;

selecting, using a multiplexer, data defining the image at the first resolution from the low resolution scanline buffers;

passing selected data defining the image at the first resolution to one of a plurality of parallel shift registers; and sequentially shifting, in response to a clock signal of the first resolution, data defining the image at the first resolution out of the shift registers so as to be input to the plurality of extensive and antiextensive filters.

17. The method of claim 9, wherein the second resolution is an integer multiple of the first resolution.

18. The method of claim 17, wherein the second resolution is double the first resolution.

19. The method of claim 18, wherein the plurality of image phases includes at least four phases.

20. The method of claim 9, wherein the second resolution is a non-integer multiple of the first resolution.

* * * * *